United States Patent [19]

Buzak

[11] Patent Number: 4,670,744
[45] Date of Patent: Jun. 2, 1987

[54] LIGHT REFLECTING THREE-DIMENSIONAL DISPLAY SYSTEM

[75] Inventor: Thomas S. Buzak, Beaverton, Oreg.

[73] Assignee: Tektronix, Inc., Beaverton, Oreg.

[21] Appl. No.: 711,792

[22] Filed: Mar. 14, 1985

[51] Int. Cl.⁴ .............................................. G09G 3/36
[52] U.S. Cl. .................................. 340/716; 340/784; 340/705; 340/700; 350/334
[58] Field of Search .............. 340/703, 705, 716, 783, 340/784, 700; 350/334, 330

[56] References Cited

U.S. PATENT DOCUMENTS

| 2,543,793 | 3/1951 | Marks | 340/705 |
| 2,670,402 | 2/1954 | Marks | 340/783 |
| 4,190,856 | 2/1980 | Ricks | 358/88 |

OTHER PUBLICATIONS

Scheffer, *Twisted Nematic Display with Cholesteric Reflector*, J. Phys. D: Appl. Phys., vol. 8, 1441–48 (1975).
Stover, *Terminal Puts 3-D Graphics on Solid Ground*, Electronics, Jul. 28, 1981, pp. 150–155.
Tamura et al., *Multilayered 3-D Display . . .*, Applied Optics, vol. 21, No. 20, pp. 3659–3663 (10/15/82).
Tamura et al., *Multilayer 3-D Display Adapter*, Applied Optics, vol. 17, No. 23, pp. 3695–3696.

*Primary Examiner*—Marshall M. Curtis
*Attorney, Agent, or Firm*—John D. Winkelman; Paul S. Angello

[57] ABSTRACT

A display system (10) receives from a light source (12) a sequence of images, each representing a different depth plane of a subject, and selectively reflects each image from its corresponding one of plural light direction modulators (16 and 18) to synthesize a three-dimensional image of the subject. Each modulator is positioned along an axis (20) at a location that corresponds to a different depth plane. Each modulator reflects the first image incident to it and transmits the succeeding images in the sequence. In a display system having N+1 depth plane images, each of N modulators comprises a variable optical retarder (34) and a liquid crystal chiral cell (36). The N modulators reflect left-circularly polarize light and transmit right-circularly polarized light. An N+1 modulator preferably comprises a liquid crystal chiral cell and reflects light incident to it. An alternative embodiment (50) develops full color images.

40 Claims, 8 Drawing Figures

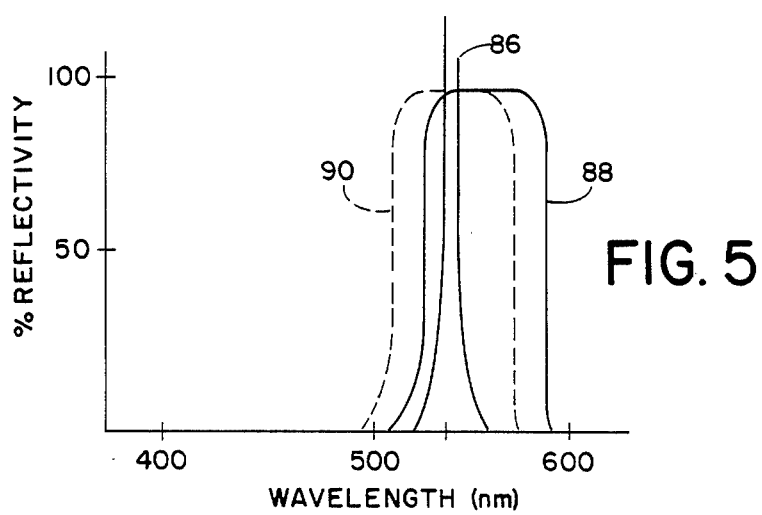
FIG. 5
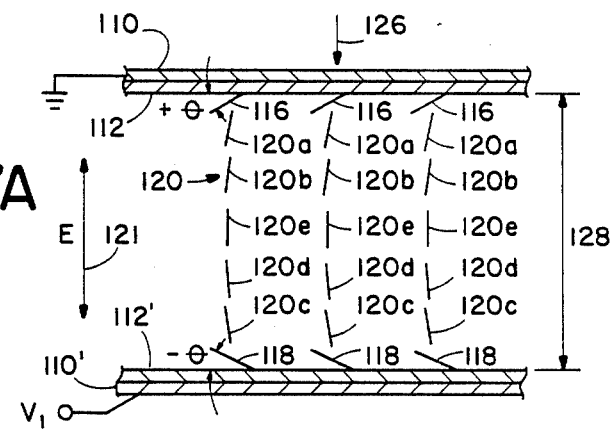
FIG. 7A (on)
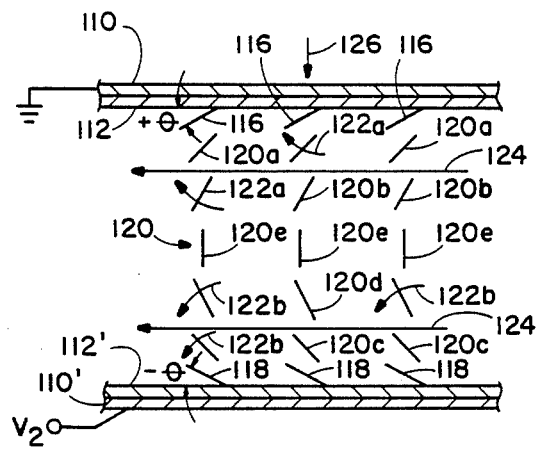
FIG. 7B (off)

LIGHT REFLECTING THREE-DIMENSIONAL DISPLAY SYSTEM

TECHNICAL FIELD

The present invention relates to three-dimensional display systems, and more particularly, to such a display system that receives a sequence of light images, each representing a different depth plane of a subject, and selectively reflects each image from its corresponding one of plural light direction modulators to synthesize a three-dimensional image of the subject.

BACKGROUND OF THE INVENTION

There have been known display systems that form a composite three-dimensional image by sequentially emitting from an image source a series of two-dimensional images representing different depth planes of a three-dimensional subject. Each depth plane image is typically reflected by a mirror that is positioned to provide an optical path of predetermined length between the image source and an observer. Each depth plane image travels a different optical path length to create for the observer a composite light image having the appearance of depth. The resulting three-dimensional image has, therefore, full vertical, horizontal, and head-motion parallax. Display systems of this type are useful for examining three-dimensional images that consist of a series of visual planar data, such as, for example, ultrasound scans of tissue, wiring diagrams for multilayer printed circuit boards, air traffic control scans, and architectural plans.

Display systems that form the three-dimensional image by using mechanical means to change the position of the reflecting surface of a mirror to reflect depth plane images at different optical path locations are described in the article "Terminal puts three-dimensional graphics on solid ground,38 *Electronics*, 150-155 (July 28, 1981), by Stover. One system of this type employs a flat-plate mirror that repetitively moves back and forth along a straight line path. The mirror crosses plural locations along the path, each location corresponding to a different depth plane of a three-dimensional subject. Depth plane images emitted from an image surface are reflected from each location to an observer's eyes to produce the composite three-dimensional image. These display systems have proved to be mechanically impractical because of the precision required to match the instantaneous position of the mirror to the appearance of the corresponding depth plane image on the image surface.

A second system substitutes a varifocal mirror for the movable mirror described above. A varifocal mirror is one whose focal length changes with mechanical vibration. The vibration causes a continuous change in the shape (i.e., convex, flat, and concave) of the reflecting surface of the mirror. Changing the shape of the mirror creates the impression that images reflected by it originate from different distances from the observer. The mirror is vibrated in response to a signal that is synchronized with the appearance of depth plane images emitted from a cathode ray tube.

The varifocal mirror system suffers from a number of inherent drawbacks. First, the mirror continuously changes its shape and, as a consequence, eventually wears out. Second, the mechanical vibration causes a sinusoidal change in the focal length of the mirror. The varifocal mirror loses, therefore, the constancy of magnification obtainable with a flat-surface mirror. As a consequence, the images reflected from the mirror are deformed, thereby requiring compensation in the form of opposite deformation by pre-distortion of the images emitted from the cathode ray tube. Third, the vibrating mirror produces an unacceptable acoustic rumble because it behaves much like an audio speaker. The acoustic rumble can be prevented by maintaining the fundamental frequency of the mirror below 30 Hz, but this low frequency of reflection can cause flicker in the three-dimensional image. Fourth, the varifocal mirror system is not suitable as a color display. This is so because the persistence of phosphor emissions from a shadow mask cathode ray tube would cause a smearing of successive depth plane color images as the mirror continuously changes its focal length. To develop color images in a varifocal mirror system, one must terminate the phosphor emissions while the mirror changes its focal length to that corresponding to the next depth plane. Full color phosphors with the required persistence characteristics are not currently available.

A display system that relies on nonmovable flat-plate mirrors to form a three-dimensional light image is described in U.S. Pat. No. 4,190,856 to Ricks. The display system of Ricks employs an assembly of beam splitters or semitransparent mirrors in association with plural cathode ray tubes to form the three-dimensional image. The display system also includes at least one positive lens for repositioning the image toward an observer. Each cathode ray tube emits an image corresponding to a different depth plane. The images propagate concurrently through the semitransparent mirrors and combine on a common optical path to form a composite image. Since the images emitted from each cathode ray tube travel along different optical path lengths, the composite image appears to have depth.

This system suffers from the disadvantages of requiring plural cathode ray tubes and extensive electrical drive circuitry, thereby making a display system capable of developing numerous depth plane images quite large and expensive. In addition, an increase in the number of depth planes increases the optical path length required to develop a three-dimensional image. Increasing the optical path length limits the angle from which the image is viewable.

Another three-dimensional display system that uses plural cathode ray tubes and multidirectional beam splitters is described in the article "Multilayered 3-D display by multidirectional beam splitter," *Applied Optics*, Vol. 21, No. 20, 3659-3663 (Oct. 15, 1982), by Tamura and Tanaka. This structure also suffers from the disadvantage of a long optical path length and image degradation resulting from the thicknesses of the beam splitters.

A three-dimensional display system comprising an adapter that fits over the image face or screen of a single cathode ray tube is described in the article "Multilayer 3-D display adapter," *Applied Optics*, Vol. 17, No. 23, 3695-3696 (Dec. 1, 1978), by Tamura and Tanaka. The adapter employs semitransparent and fully-reflecting mirrors to produce optical paths of different lengths that develop the different image depth planes. In this display system, the optical path lengths are so large that the three-dimensional effect is diminished. In addition, since the adapter effectively divides the single-image face into several subfaces, each depth plane image, as well as the image window, is small.

A display system that uses a twisted nematic liquid crystal cell in association with a cholesteric liquid crystal layer to develop a two-dimensional image in a predetermined color is described in the article "Twisted nematic display with cholesteric reflector," *J. Phys. D: Appl. Phys.*, Vol. 8, 1441–48 (1975), by Scheffer The single-color display receives linear polarized light rays of many wavelengths whose direction of polarization is selectively rotated by 0° or 90° by the twisted nematic cell. A quarter-wave plate positioned between the twisted nematic cell and the cholesteric layer receives the linearly polarized light rays passing through the twisted nematic cell and converts them to left- or right-circularly polarized light rays, depending upon the polarization direction of the incident light rays.

Within its reflection band of wavelengths, the cholesteric layer reflects circularly polarized light rays of the rotational sense of its helical twist and transmits circularly polarized light rays of the opposite rotational sense. Outside its reflection band, the cholesteric layer transmits light rays of all polarization states.

Scheffer describes the operation of a left-hand twist cholesteric layer as follows. Whenever the twisted nematic cell rotates the polarization direction of the incident light rays by 90°, left-circularly polarized light rays are incident on the cholesteric layer which reflects the light rays in an iridescent color that characterizes the layer. The single-color light rays reflect back through the system to be viewed by an observer. Whenever the twisted nematic cell rotates the polarization direction by 0°, right-circularly polarized light rays pass through the cholesteric layer and strike an absorbing material, which provides a preferred background for the colored image previously reflected.

The Scheffer article describes only a technique for producing a single-color two-dimensional image with the use of a twisted nematic cell and a cholesteric layer. The display system of Scheffer has not heretofore been suggested or adapted for use in either a monochrome or full color three-dimensional display system.

SUMMARY OF THE INVENTION

An object of this invention is, therefore, to provide a light reflecting three-dimensional display system that produces an image that has full vertical, horizontal and head-motion parallax when observed from a wide range of viewing angles.

Another object of this invention is to provide such a display system that is compact, has no mechanically driven parts, and requires only a single image source.

A further object of this invention is to provide such a display system that requires no image source pre-distortion or nonlinear magnification compensation to develop an image of good quality.

Still another object of this invention is to provide such a display system that is operable to develop with the use of a shadow mask cathode ray tube an image in full color and sharp detail.

Yet another object of this invention is to provide in such a display system a liquid crystal electro-optic switching device and a liquid crystal chiral cell to produce either monochrome or full color three-dimensional images.

Additional objects and advantages of the present invention will be apparent from the following detailed descriptions of preferred embodiments thereof, which proceed with reference to the accompanying drawings.

BRIEF DESCRIPTION OF THE DRAWINGS

FIG. 5 is a graph showing for the preferred embodiments of the display system of the present invention the relationship between the phosphor emission characteristic of the green light emitted by the cathode ray tube and the reflection characteristic of a chiral cell tuned to green light.

FIGS. 7A and 7B are schematic diagrams of the director alignment configuration of the liquid crystal cell of the variable optical retarder incorporated in the preferred embodiments of the optical display system of the present invention in, respectively, the field aligned "ON" state and the partly relaxed "OFF" state.

DETAILED DESCRIPTION OF PREFERRED EMBODIMENTS

General Description of Display System Operation

Figure 1:
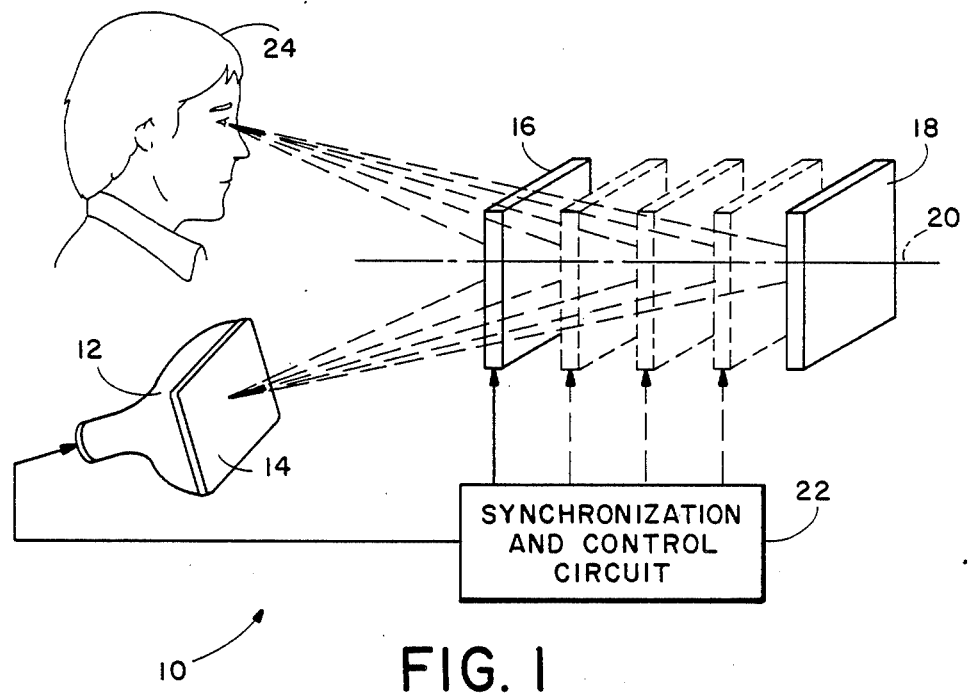
FIG. 1 is a pictorial view of a light reflecting three-dimensional display system of the present invention that comprises two depth planes with additional depth planes shown in phantom for increasing resolution of the synthesized three-dimensional image.

FIG. 1 is a simplified pictorial representation of a display system 10 that is designed to develop a three-dimensional image comprised of two depth plane images in accordance with the present invention.

With reference to FIG. 1, a light source 12, such as a cathode ray tube, emits from its screen 14 a sequence of two-dimensional images that correspond to different depth planes of a three-dimensional subject (not shown). The images propagate toward first and second light direction modulating means 16 and 18, which are positioned in spaced-apart, generally parallel relation along an axis 20. First modulating means 16 corresponds to a first depth plane, and second modulating means 18 corresponds to a second depth plane of a longer optical path than that of the first depth plane. Optical path length is defined as the distance an image travels from the cathode ray tube to an observer. Since display system 10 develops images of only two depth planes, cathode ray tube 12 emits in alternate succession images corresponding to them.

A synchronization and control circuit or means 22 applies control signals to first modulating means 16 in synchronism with the production of the depth plane images by cathode ray tube 12. Control signals of first and second voltages are applied to first modulating means 16 at different times to selectively cause it to, respectively, reflect and transmit an incident image. Second modulating means 18 is positioned to receive and reflect the image transmitted by first modulating means 16.

To synthesize a three-dimensional image, control circuit 22 switches first modulating means 16 in synchronism with the appearance of the depth plane images on screen 14 of cathode ray tube 12. Whenever the first depth plane image appears on screen 14, control circuit 22 applies the first voltage to first modulating means 16 to cause it to reflect the image to the eyes of an observer 24. Whenever the second depth plane image appears on screen 14, control circuit 22 applies the second voltage to first modulating means 16 to cause it to transmit the image to second modulating means 18, which reflects the image back through first modulating means 16 to the eyes of observer 24. The reflected depth plane images combine to form a three-dimensional image of the subject. The different optical path lengths that the first and second depth plane images travel to reach observer 24 create the three-dimensional effect of the composite image.

The resolution of the three-dimensional image can be enhanced by increasing the number of depth planes. This can be accomplished by positioning additional ones of the first modulating means 16 (shown in phantom in FIG. 1) upstream of second modulating means 18. Cathode ray tube 12 emits in each image sequence an additional number of depth plane images that equal the number of first modulating means 16 added to system 10. Control circuit 22 delivers signals of the second voltage to each of the first modulating means 16 which are positioned upstream of the one of the first modulating means 16 that reflects the depth plane image produced by cathode ray tube 12.

Monochrome Display System

Figure 2:
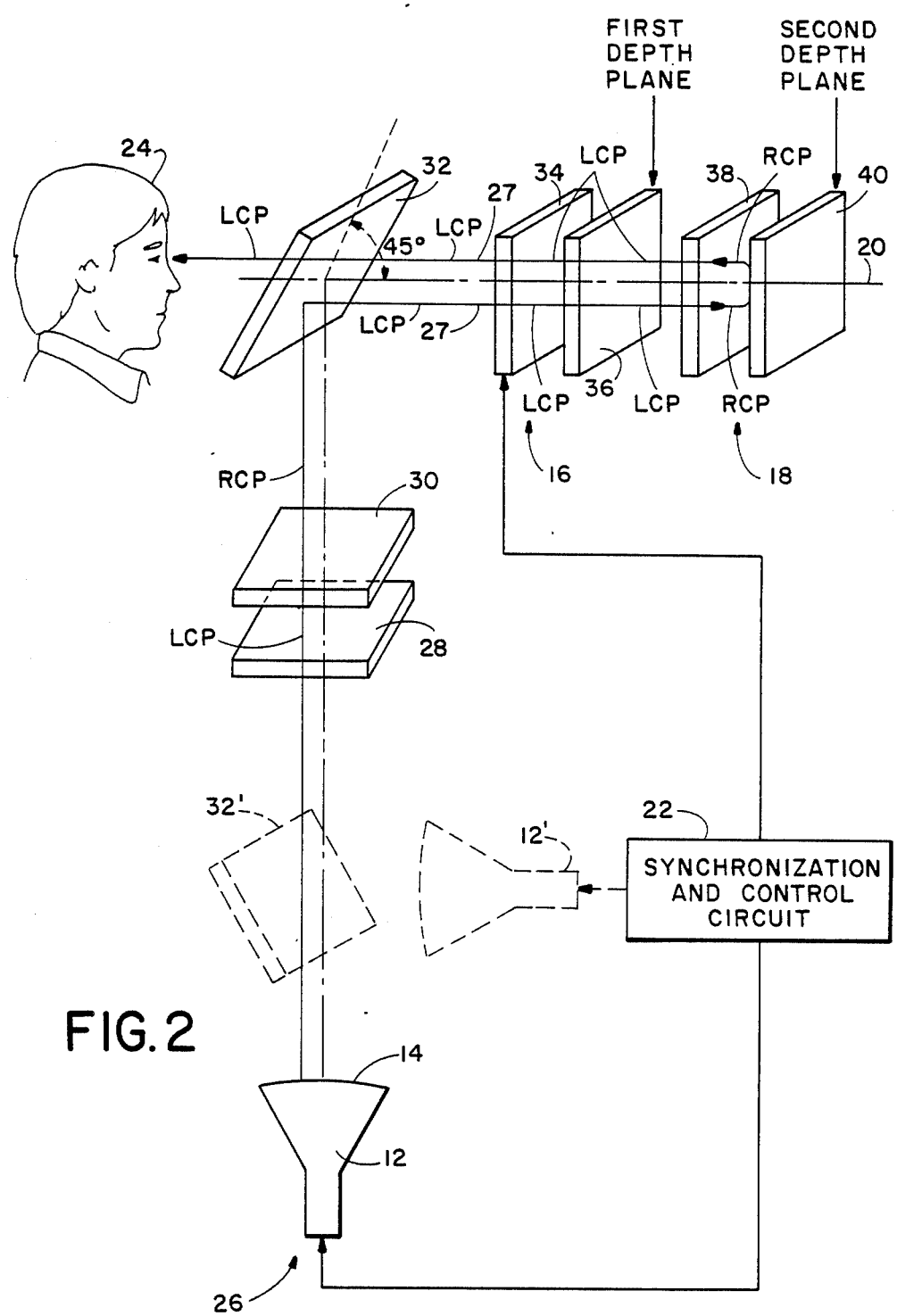
FIG. 2 is a diagram of an embodiment of a monochrome display system of the present invention.

FIG. 2 is a diagram of a monochrome display system 26 of the present invention.

With reference to FIG. 2, monochrome display system 26 forms a three-dimensional image of two depth planes. Cathode ray tube 12 emits from its screen 14 unpolarized light rays that carry the depth plane images. (The number of depth plane images may be increased, for example, by including an additional cathode ray tube 12' and mirror 32' as depicted in phantom at the locations shown in FIG. 2.) FIG. 2 shows the path 27 and polarization state of an exemplary light ray that reflects from the second depth plane. The nomenclature "LCP" and "RCP" refer to, respectively, left-circularly polarized and right-circularly polarized light. In the monochrome system, cathode ray tube 12 preferably emits green light. The unpolarized light rays strike a right-hand twist liquid crystal chiral cell 28 which reflects only right-circularly polarized light rays within a narrow wavelength range of about 40 nanometers. Chiral cells of this character are known in the art and function in a manner similar to that described above for the cholesteric layer employed by Scheffer. Chiral cell 28 is preferably tuned to reflect green light to match the color of light emitted by the cathode ray tube. Since the unpolarized light rays striking chiral cell 28 represent the superposition of left- and right-circularly polarized light rays, left-circularly polarized green light rays exit chiral cell 28 and strike half-wave plate 30, which is tuned to provide half-wave retardation of green light. Half-wave plate 30 receives the left-circularly polarized light rays and converts them to right-circularly polarized light rays that strike a semitransparent dielectric mirror 32 which is inclined at a 45° angle relative to axis 20. The light rays reflected by mirror 32 are left-circularly polarized and propagate toward first light direction modulating means 16. (One can also operate display system 26 without mirror 32 by angularly displacing cathode ray tube 12 and observer 24 relative to axis 20 as shown in FIG. 1 and by removing half-wave plate 30.)

First modulating means 16 comprises a variable optical retarder 34 that is spaced-apart from and in generally parallel relation with a right-hand twist liquid crystal chiral cell 36. Variable optical retarder 34 changes the rotational sense of the polarization state of incident light rays by changing the amount of retardation applied to them as they travel through it. Variable optical retarder 34 selectively develops zero retardation and half-wave retardation of normally incident green light in response to the two voltage signals developed by control circuit 22. The two amounts of optical retardation cause circularly polarized green light rays to exit variable optical retarder 34 in one of two orthogonally related rotational senses.

Chiral cell 36 receives the light rays transmitted by variable optical retarder 34, reflecting right-circularly polarized light rays and transmitting left-circularly polarized light rays.

The light rays transmitted by first modulating means 16 strike second modulating means 18, which comprises a half-wave plate 38 that is in spaced-apart and generally parallel relation with a right-hand twist liquid crystal chiral cell 40. Half-wave plate 38 converts the incident left-circularly polarized light rays to right-circularly polarized light rays, which strike and reflect from chiral cell 40. The spacing between variable optical retarder 34 and chiral cell 36 and between first and second modulating means 16 and 18 is accomplished for any preferred distance (e.g., 1.27 cm) with spacers (not shown) positioned on the margins of these elements. An anti-reflection coating used on these devices promotes better light transmission through the system.

Half-wave plates 30 and 38 are of similar construction, and chiral cells 28, 36, and 40 are of similar construction.

Monochrome display system 26 operates in the following manner. Whenever the first depth plane image appears on screen 14 of cathode ray tube 12, control circuit 22 applies the first voltage signal to variable optical retarder 34 to command it to the half-wave retardation or "OFF" state. Variable optical retarder 34 receives the light rays carrying the first depth plane image, converts them from left-circular polarization to right-circular polarization, and transmits them to chiral cell 36. Chiral cell 36 reflects the right-circularly polarized light rays back through variable optical retarder 34 and mirror 32 to the eyes of observer 24.

Whenever the second depth plane image appears on screen 14 of cathode ray tube 12, control circuit 22 applies the second voltage signal to variable optical retarder 34 to command it to the zero retardation or "ON" state. Variable optical retarder 34 receives the left-circularly polarized light rays carrying the second depth plane image and transmits them to half-wave plate 38, which converts them to right-circularly polarized light rays. Chiral cell 40 reflects the right-circularly polarized light rays back through half-wave plate 38 which reconverts them to left-circular polarization. Chiral cell 36, variable optical retarder 34, and mirror 32 transmit the left-circularly polarized green light rays carrying the second depth plane image to observer 24. The portion of light reflected by mirror 32 away from observer 24 is scattered at screen 14 of cathode ray tube 12 and does not appreciably affect image contrast.

The embodiment depicted in FIG. 2 is configured to employ liquid crystal chiral cells of the same construction. It will be appreciated, however, that removing half-wave plate 38 and replacing chiral cell 40 with a left-hand twist liquid crystal chiral cell provides an equivalent display system. In addition, chiral cell 28 and half-wave plate 30 can be replaced by a left-hand twist liquid crystal chiral cell or, alternatively, by a neutral linear polarizer and a quarter-wave plate.

As was stated previously, the number of depth planes forming the three-dimensional image can be increased by increasing the number of first modulating means 16, each comprising variable optical retarder 34 and chiral cell 36, and positioning them between mirror 32 and second modulating means 18.

Full Color Display System

Figure 3:
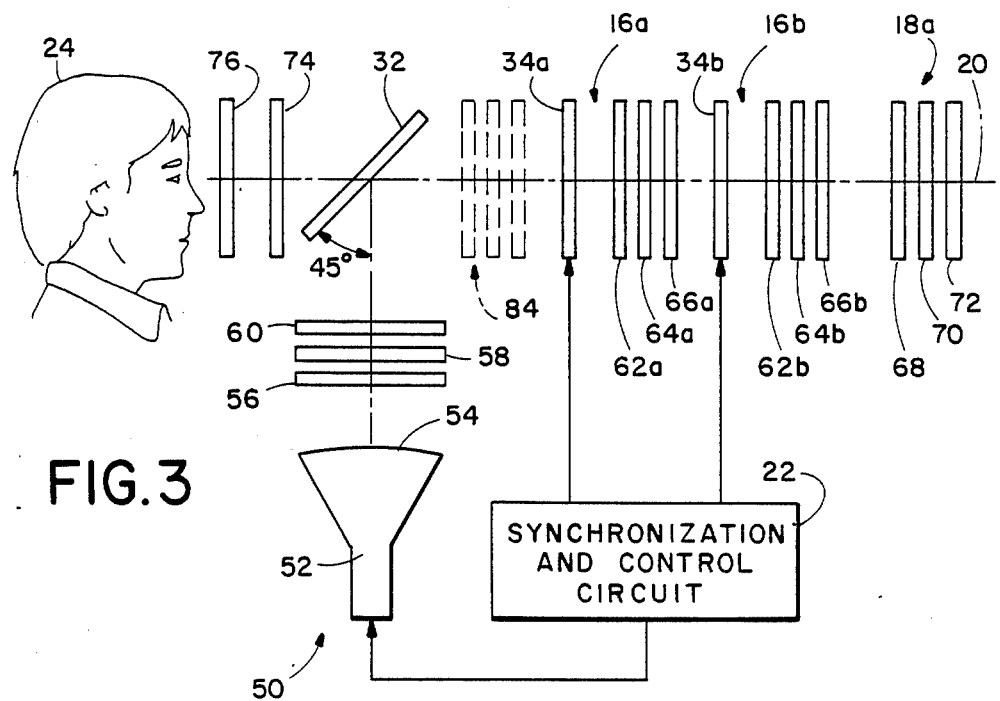
FIG. 3 is a diagram of an embodiment of a full color display system of the present invention.

FIG. 3 is a diagram of a full color display system 50 designed in accordance with the present invention.

With reference to FIG. 3, display system 50 is designed to develop a three-dimensional image of three image planes in full color. Light source 52 emits from its screen 54 unpolarized light rays that carry the depth plane images in three primary colors, such as red, green, and blue. Light source 52 preferably comprises a shadow mask cathode ray tube. The light rays emitted from screen 54 strike three generally parallel left-hand twist liquid crystal chiral cells 56, 58, and 60 which are tuned to the respective colors green, red, and blue.

Right-circularly polarized light rays of the colors green, red, and blue exit chiral cell 60 and reflect from mirror 32, which converts them from right-to left-circular polarization. The left-circularly polarized light rays reflected by mirror 32 are selectively reflected by the first light modulating means 16a and 16b and the second light modulating means 18a in response to the voltage signals produced by control circuit 22.

First light modulating means 16a comprises a variable optical retarder 34a and three right-hand twist liquid crystal chiral cells 62a, 64a, and 66a, which are preferably constructed as a single assembly. Chiral cells 62a, 64a, and 66a are tuned to the respective colors green, red, and blue and appear in the order shown in FIG. 3 only for convenience in describing the operation of the system. The preferred order would be blue, green, and red in the direction away from observer 24. The reason is that images in colors of longer wavelengths appear to be closer to the observer. The preferred order recited compensates for this effect. First modulating means 16a and 16b which correspond to, respectively, the first depth plane and the second depth plane include optical elements of similar construction that are identified by identical reference numerals followed by a different lower case letter. Variable optical retarders 34a and 34b are tuned to provide half-wave retardation of green light. Second modulating means 18a, which corresponds to the third depth plane, comprises three left-hand twist liquid crystal chiral cells 68, 70, and 72, which are tuned to the respective colors green, red, and blue.

A quarter-wave plate 74 and a neutral linear polarizer 76 are positioned between observer 24 and mirror 32 and comprise a means for preventing the transmission of contaminant light rays that create spurious images, as will be further described below.

Each one of the sets of three chiral cells could be replaced by a single cell or a set of two cells if the respective reflection band or composite reflection band is sufficiently wide to reflect light of each of the primary colors.

Figure 4:
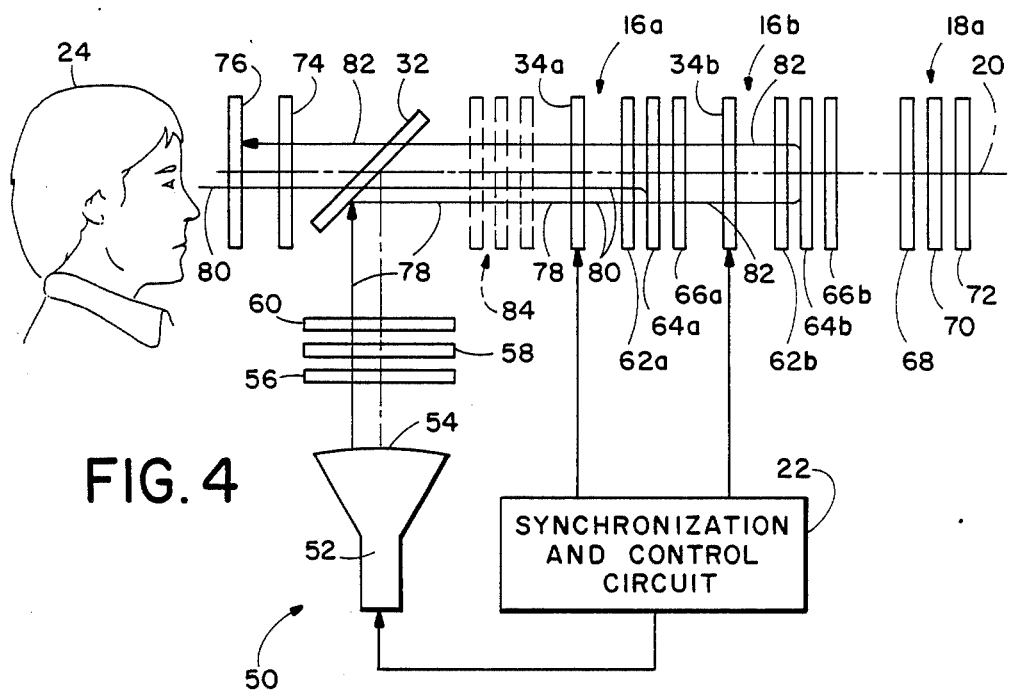
FIG. 4 is the full color display system of FIG. 3 having superimposed thereon the optical path segments of an exemplary light ray for showing the creation and suppression of spurious light components.

The operation of color display system 50 is analogous to that described for monochrome display system 10 of FIG. 2. FIG. 4 shows the optical path of an exemplary contaminant light ray superimposed on the the color display system 50 diagram of FIG. 3 for explaining the suppression of contaminant light transmission by quarter-wave plate 74 and polarizing filter 76. The example shown in FIG. 4 presents the case in which the first depth plane image is reflected from first modulating means 16a. Under these circumstances, variable optical retarders 34a and 34b are commanded to the "OFF" state. The first depth plane image is the one most susceptible to spurious image formation by contaminant light transmission.

The left-circularly polarized light rays carrying the first depth plane image reflect from mirror 34 and strike variable optical retarder 34a in its "OFF" state. Variable optical retarder 34a provides half-wave retardation for only green light and only approximately half-wave retardation of light of other colors. The effect of variable optical retarder 34a is, therefore, different for each color of light traveling through it.

Variable optical retarder 34a converts from left- to right-circular polarization the green light rays passing through it. The right-circularly polarized light rays are reflected by green chiral cell 62a and transmitted back through variable optical retarder 34a, which reconverts them to left-circular polarization. The left-circularly polarized green light rays pass through mirror 32 to be seen by observer 24. Quarter-wave plate 74 removes the circular polarization from the light rays passing through mirror 32, thereby converting them to linear polarization. Neutral polarizing filter 78 is positioned with its transmission axis aligned with the direction of the linearly polarized light rays exiting quarter-wave plate 74. Quarter-wave plate 74 is tuned to provide quarter-wave retardation of green light. It will be appreciated that unlike mirror 32, chiral cell 62a, as well as all of the chiral cells disclosed herein, reflects light rays without changing their polarization sense.

Variable optical retarder 34a does not provide exactly half-wave retardation of the incident left-circularly polarized red or blue light rays. The processing of the red light rays is described with reference to FIG. 4. The left-circularly polarized red light rays travel along optical path segment 78 toward modulating means 16a. Variable optical retarder 34a elliptically polarizes the red light rays, which pass through green chiral cell 62a and strike red chiral cell 64a. The elliptically polarized red light rays comprise a major component of greater intensity right-circularly polarized light and a minor component of significantly lesser intensity left-circularly polarized light. Red chiral cell 62a reflects the major component of right-circularly polarized red light rays which travel along optical path segment 80 back through variable optical retarder 34a, which essentially transforms the major component of red light from right- to left-circular polarization.

The major component of left-circularly polarized red light travels along path segment 80 and passes through mirror 32. Quarter-wave plate 74 removes the left-circular polarization, thereby converting the light rays to linear polarization in a direction aligned with the transmission axis of polarizing filter 76. The red light, therefore, reaches observer 24. That quarter-wave plate 74 is tuned for green light does not have an appreciable effect on the transmission of the red light to the observer.

The minor component of left-circularly polarized red light travels along optical path segment 82, passing through green chiral cell 62a, red chiral cell 64a, and blue chiral cell 66a and striking variable optical retarder 34b. Variable optical retarder 34b in the "OFF" state essentially transforms the minor component of red light from left- to right-circular polarization. The minor component of right-circularly polarized red light passes through green chiral cell 62b, reflects from red chiral cell 64b, and strikes variable optical retarder 34b along path segment 82 as shown.

Variable optical retarder 34b essentially transforms the minor component of right-circularly polarized red light from right- to left-circular polarization, and variable optical retarder 34a essentially transforms the red light rays back to right-circular polarization. The minor component of right-circularly polarized red light rays passes through mirror 32. Quarter-wave plate 74 removes the right-circular polarization, thereby converting the light rays to linear polarization in a direction aligned with the absorption axis of polarizing filter 76. The absorbed right-circularly polarized light rays represent the contaminant light rays, whose sense of polarization is orthogonally related to the light rays intended for transmission to the observer. If they are not absorbed as described, the contaminant light rays would appear as a ghost image reflected from an incorrect depth plane.

Left-circularly polarized blue light rays are processed through color display system 50 in an analogous manner to that described above for left-circularly polarized red light rays.

It will be appreciated that quarter-wave plate 74 and linear polarizing filter 76 suppress the transmission of contaminant light rays created by the inability of the variable optical retarders 34a and 34b to provide exactly half-wave retardation of light rays of all colors. That quarter-wave plate 74 is tuned only to green light has a negligible effect on the suppression of ghost images. The reason is that the contaminant light rays traveling through the display system undergo several transformations between polarization senses that diminish their intensity before they strike quarter-wave plate 74. The action of quarter-wave plate 74 and polarizing filter 76 is, therefore, sufficient to absorb a substantial amount of the remaining incident contaminant light of diminished intensity. The light rays transmitted to observer 24 are, therefore, substantially free from spurious images.

Three right-hand twist liquid crystal chiral cells 84 (shown in phantom) may be substituted for quarter-wave plate 74 and neutral polarizing filter 76. The three chiral cells would be positioned between mirror 32 and variable optical retarder 34a.

FIG. 5 is a graph showing for different display system viewing angles the relationship between the phosphor emission peak 86 of the green light emitted from cathode ray tube and the reflection characteristic of a chiral cell tuned for green light. The solid line characteristic 88 represents the reflectivity of the chiral cell at a viewing angle normal to the surface of the cell, and the broken line characteristic 90 represents the reflectivity of the chiral cell at a viewing angle of approximately 30° from the surface normal. It is apparent that the reflectivity of the chiral cell shifts to shorter wavelengths as the viewing angle increases relative to the surface normal. To compensate for this effect, each one of the chiral cells described herein is tuned so that the phosphor emission peak lies near the short wavelength of its reflection band. Tuning the cell in this manner ensures that the intensity of the colored light remains substantially uniform for typical viewing angles.

Switching Sequence for Decreasing Transition Time Between Successive Images

The preferred embodiment of the variable optical retarder, which is described in detail below, requires substantially less time to complete a transition from the "OFF" state to the "ON" state. Table I shows the preferred depth plane image switching sequence for a switching system having $N+1$ depth planes. Since the variable optical retarder requires less switching time during the transition from its "OFF" state to its "ON" state, the N variable optical retarders of the N first light direction modulating means are initially commanded by the control circuit to the "OFF" state at the start of the sequence of $N+1$ depth plane images.

TABLE I

DEPTH PLANE IMAGE SWITCHING SEQUENCE

| VARIABLE OPTICAL RETARDER | | | | | | RELATIVE SPEED OF TRANSITION | DEPTH PLANE IMAGE REFLECTED |
|---|---|---|---|---|---|---|---|
| 1 | 2 | 3 | 4...N−1 | | N | | |
| OFF | OFF | OFF | OFF | OFF | OFF | | 1 |
| | | | | | | Fast | |
| ON | OFF | OFF | OFF | OFF | OFF | | 2 |
| | | | | | | Fast | |
| ON | ON | OFF | OFF | OFF | OFF | | 3 |
| | | | | | | Fast | |
| ON | ON | ON | OFF | OFF | OFF | | 4 |
| | | | | | | Fast | |
| ... | | | ... | | | | ... |
| ON | ON | ON | ON | OFF | OFF | | N − 1 |
| | | | | | | Fast | |
| ON | ON | ON | ON | ON | OFF | | N |
| | | | | | | Fast | |
| ON | ON | ON | ON | ON | ON | | N + 1 |
| | | | | | | Slow | |
| OFF | OFF | OFF | OFF | OFF | OFF | | 1 |

With reference to Table I, variable optical retard numbers 1 and N represent the variable optical retarders positioned, respectively, nearest to and fartherst from observer 24. It is apparent that each one of the N variable optical retarder controls the reflection of the first image incident to it and transmits the following images in the sequence. After the $N+1$ depth plane image appears on the cathode ray tube screen and is reflected by the chiral cell of the second light direction modulating means, the N variable optical retarders are simultaneously commanded by the control circuit from the "ON" state to the "OFF" state in anticipation of the start of the next succeeding sequence of $N+1$ depth plane images. The above-recited procedure requires, therefore, only one relatively slow transition for each image depth plane sequence, irrespective of the number of depth planes used.

Liquid Crystal Variable Optical Retarder

A preferred embodiment of the present invention incorporates a liquid crystal cell operating as a variable optical retarder that controls the retardation of light passing therethrough in response to the intensity of an electric field produced by an excitation voltage applied to the cell electrode structures.

Figure 6:
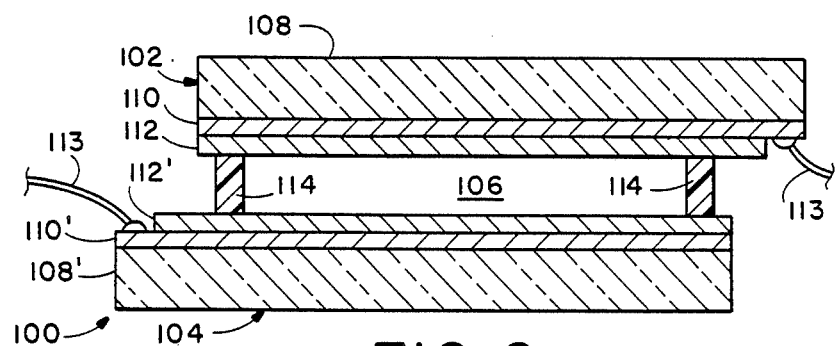
FIG. 6 is a diagrammatic cross-sectional view of a liquid crystal cell which is used as a zero to half-wave optical retarder in accordance with the present invention.

With reference to FIG. 6, liquid crystal cell 100 includes a pair of generally parallel, spaced-apart electrode structures 102 and 104 with nematic liquid crystal material 106 included therebetween. Electrode structure 102 comprises glass dielectric substrate 108 that has on its inner surface a layer 110 of electrically conducting, but optically transparent, material such as indium tin oxide. Director alignment film layer 112 is applied to conductive layer 110 and forms a boundary between electrode structure 102 and liquid crystal material 106. The surface of film 112 which contacts the liquid crystal material is conditioned in accordance with one of two preferred methods to promote a preferred orientation of the directors of the liquid crystal material in contact therewith. The materials constituting and the corresponding methods of conditioning the director alignment film 112 are described in detail hereinbelow. Electrode structure 104 is of a construction similar to that of electrode structure 102, and the components corresponding to those of electrode structure 102 are shown with identical reference numerals followed by primes.

The short length edges of electrode structures 102 and 104 are offset relative to each other to provide access to conductive layers 110 and 110' for connecting at terminals 113 the output conductors of control circuit 22. Spacers 114 may be comprised of any suitable material such as glass fiber to preserve the general parallel relation between electrode structures 102 and 104.

With reference to FIGS. 7A and 7B, the nematic director alignment configuration of layers 112 and 112' in liquid crystal cell 100 is described in Column 7, lines 48-55 of U.S. Pat. No. 4,333,708 of Boyd, et al. It will be understood, however, that the liquid crystal cell described in the Boyd, et al. patent differs from that used in the present invention in that the former includes an alternating-tilt geometry type configuration of which the director alignment of cell 100 comprises only a portion. The cell of the Boyd, et al. patent is constructed to promote disclination movement within the cell in an attempt to provide a bistable switching device.

The film layer 112 of electrode structure 102 is conditioned so that the electrode structure surface contacting directors 116 are aligned parallel to each other at a tilt bias angle $+\theta$, which is measured in the counterclockwise sense with reference to the surface of film layer 112. The film layer 112' of electrode structure 104 is conditioned so that the electrode structure surface contacting directors 118 are aligned parallel to each other at a tilt bias angle $-\theta$, which is measured in the clockwise sense with reference to the surface of film layer 112'. Thus, liquid crystal cell 100 is fabricated so that the surface contacting directors 116 and 118 of the opposed surfaces of director alignment layers 112 and 112' of electrode structures 102 and 104, respectively, are tilt-biased in opposite directions.

A first preferred method of effecting the desired alignment of the surface contacting directors entails the use of polyimide as the material that comprises the alignment film layers 112 and 112' on electrode structures 102 and 104, respectively. Each alignment film layer is rubbed to produce a tilt bias angle $|\theta|$, with 2° to 5° being the preferred range. A second preferred method of effecting the desired alignment of the surface contacting directors entails the use of silicon monoxide as the material which comprises the alignment film layers 112 and 112' of electrode structures 102 and 104, respectively. The silicon monoxide layer is evaporated and vapor deposited preferably at a 5° angle measured from the electrode structure surface in an amount sufficient to produce a tilt bias angle $|\theta|$ of between 10° to 30°, with 15° to 25° being the preferred range.

It will be appreciated that methods for depositing silicon monoxide or other alignment materials to align liquid crystal molecules in a predetermined direction have been disclosed previously by others and are known to those having ordinary skill in the art. One such method, for example, is disclosed in U.S. Pat. No. 4,165,923 of Janning.

FIG. 7A depicts the orientation of surface noncontacting directors 120 when an AC signal $V_1$ of approximately 2 kHz and 20 Vrms is applied to conductive layers 110 and 110' of electrode structures 102 and 104, respectively. The signal $V_1$ on conductive layer 110' with conductive layer 110 grounded constitutes a first switching state produced at the output of control circuit 22 and produces an alternating electric field, E, between electrode structures 102 and 104 within the liquid crystal cell 100 to force the cell into its "ON" optical retardation state. A substantial number of the surface noncontacting directors 120 of a liquid crystal material 106 that has a positive anisotropy value align essentially end-to-end along direction 121 of the electric field flux lines within the cell, which direction is normal to the conditioned surfaces of the electrode structures. Thus, when cell 100 is excited into its "ON" state, the surface noncontacting directors 120 are aligned perpendicularly to the surfaces of the cell.

FIG. 7B depicts the orientation of surface noncontacting directors 120 after the signal $V_1$ is removed so that the alignment of surface noncontacting directors is influenced not by an electric field produced between electrode structures 102 and 104 within the cell, but by the intermolecular elastic forces which cause relaxation of the surface noncontacting directors from the end-to-end alignment of the "ON" state. The removal of signal $V_1$ constitutes a second switching state produced at the output of control circuit 22. The director orientation shown in FIG. 7B corresponds to that of "OFF" optical retardation state of the cell.

Switching cell 100 to the "OFF" state can also be accomplished by applying to layer 110' of the cell an AC signal $V_2$ produced at the output of control circuit 22 having a voltage level which is less than that of signal $V_1$ and generally near 0 V. The frequency of signal $V_2$ is generally the same as that of signal $V_1$.

During the transition from the "ON" state to the "OFF" state of the liquid crystal cell, the surface noncontacting directors recede from the end-to-end alignment normal to the electrode structure surfaces and attempt to assume a generally parallel relation with the adjacent directors. Thus, surface noncontacting directors 120a and 120b rotate in a clockwise sense as shown by direction arrows 122a in order to achieve a near-parallel relation as respects directors 116 and 120a, respectively; and surface noncontacting directors 120c and 120d rotate in a counterclockwise sense as shown by direction arrows 122b to achieve a near-parallel relation as respects directors 118 and 120c, respectively. Thus, when cell 100 relaxes to its "OFF" state, each one of a substantial number of the surface noncontacting directors is aligned so that it projects a director component onto the surfaces of the cell. The surface noncontacting directors, however, lie approximately in a plane which is perpendicular to the surfaces of the cell.

The method of operating the liquid crystal cell 100 as a variable optical retarder is directed to the disclination-free surface noncontacting director relaxation from the electric field aligned or "ON" state depicted by FIG. 7A to the planar configuration or "OFF" state depicted by FIG. 7B. In the present invention, liquid crystal cell 100 is operated as a zero to half-wave retarder whose optic axis corresponds to the alignment direction of the surface noncontacting directors 120.

Linearly polarized light which propagates in direction 126 normal to the surfaces of electrode structures 102 and 104 is coincident with the direction of surface noncontacting directors 120 when the liquid crystal cell is in the "ON" state. Directors 120 are oriented in such "ON" state so that there is a negligible projection of the optic axis on the electrode structure surfaces of the cell. Under these conditions, liquid crystal cell 100 produces substantially reduced optical retardation for incident light propagating in the direction 126.

Linearly polarized light which propagates in direction 126 normal to the surfaces of electrode structures 102 and 104 is noncoincident with the alignment direction of surface noncontacting directors when the liquid crystal cell is in the "OFF" state. Directors 120 are oriented in such "OFF" state so that each one of a substantial number of them projects a component on the electrode structure surfaces of the cell. Under these conditions, liquid crystal cell 100 has an effective birefringence for generally normally incident light. The orientation of surface noncontacting directors 120 provides essentially half-wave optical retardation for light of the wavelength which satisfies the mathematical expression: $(\Delta nd/\lambda) = \frac{1}{2}$ where d represents the thickness 128 and $\Delta n$ represents the effective birefringence of the cell.

It will be obvious to those having skill in the art that many changes may be made in the above-described details of the preferred embodiments of the present invention. The scope of the present invention, therefore, should be determined only by the following claims.

I claim:

1. A light reflecting three-dimensional display system, comprising:
   a light source that emits images which correspond to first and second depth planes of a three-dimensional subject;
   first and second light direction modulating means in optical communication with the light source, the first modulating means being operable in response to an electrical control signal to transmit and reflect an image incident to it, and the second modulating means being positioned to receive and reflect the image transmitted by the first modulating means;
   control means in communication with the first modulating means to provide the control signal for selectively reflecting the first depth plane image from the first modulating means and transmitting the second depth plane image through the first modulating means for reflection from the second modulating means, thereby to synthesize a three-dimensional image of the subject; and
   preventing means to prevent the transmission of contaminant light rays in the synthesis of the three-dimensional image.

2. The display system of claim 1 in which the first and second modulating means are positioned along an axis at different locations that correspond to the respective first and second depth planes.

3. The display system of claim 1 in which the images are carried by polarized light rays, and each one of the first and second modulating means receives and reflects light rays without changing their rotational sense of polarization.

4. The display system of claim 1 in which each one of the first and second modulating means includes a liquid crystal chiral cell.

5. The display system of claim 4 in which the light source comprises at least one phosphor having an emission peak wavelength and the chiral cells have a reflectance characteristic of a predetermined band of wavelengths, each one of the chiral cells being tuned so that the lowest wavelength of the reflectance characteristic is positioned near the emission peak wavelength.

6. The display system of claim 4 in which the second modulating means further comprises a half-wave plate.

7. The display system of claim 4 in which the liquid crystal chiral cells are of opposite-hand twists.

8. The display system of claim 1 in which the first modulating means includes a wavelength selective light reflecting means that reflects incident light rays of a predetermined sense of polarization and transmits all other incident light rays.

9. The display system of claim 8 in which the reflected light rays are included within a predetermined range of wavelengths.

10. The display system of claim 8 in which the images incident on the light reflecting means are carried by circularly polarized light rays, and the first modulating means further comprises a variable optical retarder that produces two amounts of optical retardation to develop two rotational senses of the circularly polarized light rays, thereby to cause the light rays of one rotational sense to be transmitted and the light rays of the other rotational sense to be reflected by the first modulating means.

11. The display system of claim 10 in which the two amounts of optical retardation are zero retardation and approximately half-wave retardation, thereby to develop circularly polarized light rays of the two rotational senses.

12. The display system of claim 10 in which the variable optical retarder comprises a liquid crystal cell comprising liquid crystal material which has directors and is contained between a pair of opposed electrode structures, each electrod structure having an inner surface having an inner surface that includes a director alignment layer which has been conditioned so that the director s of the liquid crystal material in contact therewith become substantially uniformly aligned to form tilt bias angles with the conditioned surfaces, the tilt bias angles of the directors in contact with one conditioned surface being defined in a rotational sense opposite to that of the tilt bias angles of the directors in contact with the other conditioned surface.

13. A light reflecting three-dimensional display system operable for use with a light source that emits a sequence of images which correspond to N+1 depth planes of a three-dimensional subject, comprising:
   N light direction modulating means in optical communication with the light source, each of the N modulating means being operable in response to an electrical signal to reflect the first image incident to it and to transmit the following images in the sequence;

a light direction modulating means in optical communication with the light source and positioned to receive and reflect the N+1 image transmitted by the N modulating means;

control means in communication with each of the N modulating means to provide control signals for reflecting the first image incident to each of the N modulating means and for transmitting the following images therethrough for reflection from the following light direction modulating means, thereby to synthesize a three-dimensional image of the subject; and preventing means to prevent the transmission of contaminant light rays in the synthesis of the three-dimensional image.

14. The display system of claim 13 in which each one of the modulating means includes a liquid crystal chiral cell.

15. The display system of claim 14 in which the liquid crystal chiral cells of the N modulating means and the modulating means that receives and reflects the N+1 image are of opposite-hand twists.

16. The display system of claim 14 in which the modulating means that receives and reflects the N+1 image further comprises a half-wave plate.

17. A light reflecting three-dimensional display system operable for use with a multicolored image producing light source that emits images corresponding to first and second depth planes of a three-dimensional subject, comprising:

first and second ight direction modulating means in optical communication with the light source, the first modulating means being operable in response to an electrical control signal to transmit and reflect a multicolored image incident to it, and the second modulating means being positioned to receive and reflect the image transmitted by the first modulating means; and control means in communication with the first modulating means to provide the control signal for selectively reflecting the first depth plane image from the first modulating means and transmitting the second depth plane image through the first modulating means for reflection from the second modulating means, thereby to synthesize a three-dimensional multicolored image of the subject; and preventing means to prevent the transmission of contaminaint light rays in the synthesis of the three-dimensional image.

18. The display system of claim 17 in which the images are carried by polarized light rays, and each one of the first and secon- modulating means receives and reflects light rays without changing their rotational sense of polarization.

19. The display system of claim 17 in which the first modulating means includes a wavelength selective light reflecting means that reflects incident light rays of a predetermined sense of polarization and a predetermined range of wavelengths corresponding to the primary colors of the images and transmits all other incident light rays.

20. The display system of claim 17 in which contaminant light rays exit the first modulating means and the preventing means is positioned so that it prevents the transmission of the contaminant light rays to an observer.

21. The display system of claim 17 in which the preventing means absorbs most of the contaminant light rays before they reach an observer.

22. The display system of claim 21 in which the preventing means is positioned in front of the observer and comprises a quarter-wave plate and a linear polarizing filter.

23. A light reflecting three-dimensional display system operable for use with a light source that emits images which correspond to first and second depth planes of a three-dimensional subject, comprising:

first and second light direction modulating means in optical communication with the light source, the first modulating means being operable in response to an electrical control signal to transmit and reflect an image incident to it, and the second modulating means being positioned to receive and reflect the image transmitted by the first modulating means; and control means in communication with the first modulating means to provide the control signal for selectively reflecting the first depth plane image from the first modulating means and transmitting the second depth plane image through the first modulating means for reflection from the second modulating means, thereby to synthesize a three-dimensional image of the subject; and preventing means to prevent the transmission of contaminant light rays in the synthesis of the three-dimensional image.

24. The display system of claim 23 in which the first and second modulating means are positioned along an axis at different locations that correspond to the respective first and second depth planes.

25. The display system of claim 23 in which the images are carried by polarized light rays, and each one of the first and second modulating means receives and reflects light rays without changing their rotational sense of polarization.

26. The display system of claim 23 in which each one of the first and second modulating means includes a liquid crystal chiral cell.

27. The display system of claim 26 in which the liquid crystal chiral cells are of opposite-hand twists.

28. The display system of claim 23 in which the first modulating means includes a wavelength selective light reflecting means that reflects incident light rays of a predetermined sense of polarization and transmits all other incident light rays.

29. The display system of claim 28 in which the images incident on the light reflecting means are carried by circularly polarized light rays, and the first modulating means further comprises a variable optical retarder that produces two amounts of optical retardation to develop two rotational senses of the circularly polarized light rays, thereby to cause the light rays of one rotational sense to be transmitted and the light rays of the other rotational sense to be reflected by the first modulating means.

30. The display system of claim 29 in which the two amounts of optical retardation are zero retardation and approximately half-wave retardation, thereby to develop circularly polarized light rays of the two related rotational senses.

31. The display system of claim 29 in which the variable optical retarder comprises a liquid crystal cell comprising liquid crystal material which has directors and is contained between a pair of opposed electrode structures, each electrode structure having an inner surface that includes a director alignment layer which has been conditioned so that the directors of the liquid crystal material in contact therewith become substantially uniformly aligned to form tilt bias angles with the conditioned surfaces, the tilt bias angles of the directors in contact with one conditioned surface being defined in a rotational sense opposite to that of the tilt bias angles of the directors in contact with the other conditioned surface.

32. The display system of claim 1 in which contaminant light rays exit the first modulating means and the preventing means is positioned so that it prevents the transmission of the contaminant light rays to an observer.

33. The display system of claim 1 in which the preventing means absorbs most of the contaminant light rays before they reach an observer.

34. The display system of claim 33 in which the preventing means is positioned in front of the observer and comprises a quarter-wave plate and a linear polarizing filter.

35. The display system of claim 13 in which contaminant light rays exit the one of the N modulating means that reflects the first imange in the sequence and the preventing means is positioned so that it prevents the transmission of the contaiminant light rays to an observer.

36. The display system of claim 13 in which the Preventing means absorbs most of the contaminant light rays before they reach an observer.

37. The display system of claim 36 in which the preventing means is positioned in front of the observer and comprises a quarter-wave plate and a linear polarizing filter.

38. The display system of claim 23 in which contaminant light rays exit the first modulating means and the preventing means is positioned so that it prevents the transmission of the contaminant light rays to an observer.

39. The display system of claim 23 in which the preventing means absorbs most of the contaminant light rays before they reach an observer.

40. The display system of claim 39 in which the preventing means is positioned in front of the observer and comprises a quarter-wave plate and a linear polarizing filter.

* * * * *